July 15, 1941.    G. F. HUTCHINGS    2,249,207
TIRE PRESSURE INDICATOR
Filed May 4, 1940
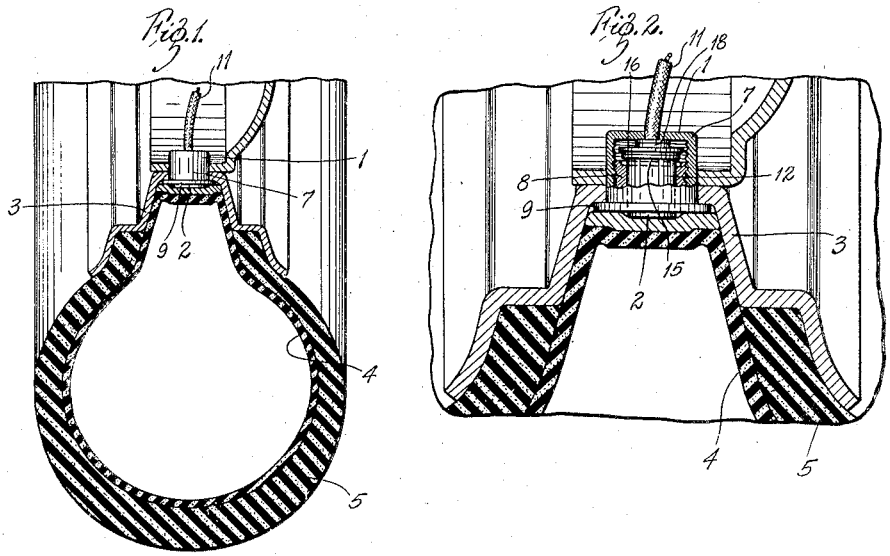
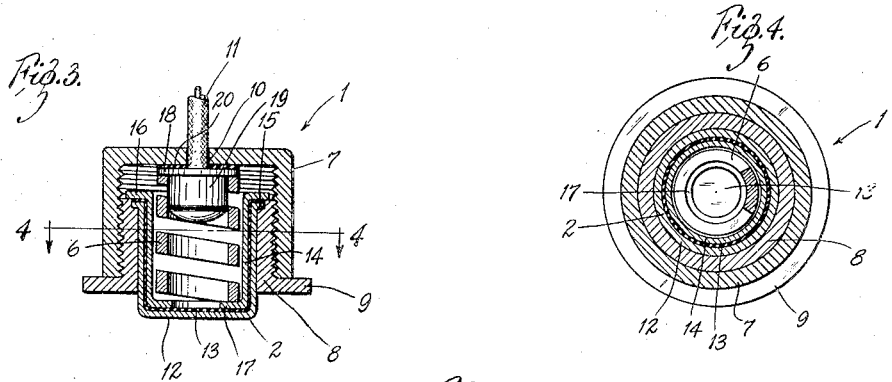
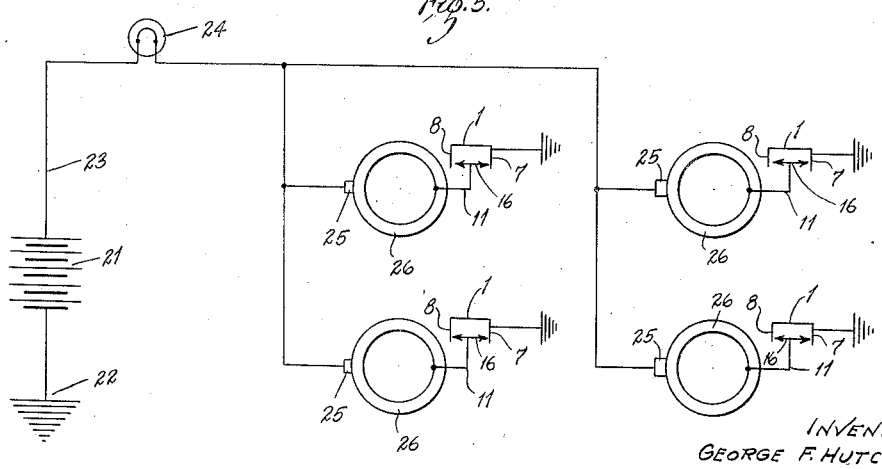
INVENTOR:
GEORGE F. HUTCHINGS,
BY John H. Cassidy
ATTORNEY.

Patented July 15, 1941

2,249,207

UNITED STATES PATENT OFFICE 2,249,207

TIRE PRESSURE INDICATOR

George F. Hutchings, St. Louis, Mo.

Application May 4, 1940, Serial No. 333,271

5 Claims. (Cl. 200—58)

This invention relates to tire pressure indicators of a type capable of indicating low or high pressure by a signal on the dash of an automobile with which it is used.

An object of the invention is to provide such a device which is simple in construction, easy to install and reliable in operation. Another object is to provide a simple device of this character which will indicate or give a signal of excessively high pressure as well as a low pressure.

A further object is to provide a unit in a tire pressure indicating system which may be conveniently attached to a tire rim and which will be compact in structure as well as efficient in operation.

Other and specific objects will be apparent from the following detail description taken in connection with the accompanying drawing.

Fig. 1 is a section showing the arrangement of an actuating device of this invention installed in a wheel in connection with a tire;

Fig. 2 is an enlarged view similar to Fig. 1;

Fig. 3 is a vertical section through the actuating device;

Fig. 4 is a horizontal section on line 4—4, Fig. 3; and

Fig. 5 is a circuit diagram.

The unit or actuating device 1 includes a housing for switch elements and a plunger 2, adapted to be mounted on an automobile tire rim 3 with the plunger extending inwardly to engage a tube 4 in a tire casing 5, in such a manner that a tube under proper pressure will push the plunger 2 inwardly with respect to its housing to break electrical contact which will be later described. The arrangement is such that when the pressure in the tube falls below a predetermined normal, a spring 6 will move the plunger 2 against the pressure of the tube 4 so that a circuit is closed to give a signal. The actuator is also arranged so that upon excessive pressure in the tube 4 an electrical contact will be made to also close the circuit.

The housing of the actuator 1 includes a cylindrical cup member 7 and a bushing member 8 having a flange 9. The cup member 7 is internally threaded for engagement with external threads on the bushing member 9. The cup member 7 has a central orifice 10 to pass a circuit wire 11.

As shown in Figs. 1 and 2, the rim 3 is bored to receive the cup member 7, the actuator being inserted from the periphery of the rim so that the flange 9 engages the periphery of the rim about the orifice in the rim. The orifice in the rim should be bored to provide a nice fit for the cup 7. If the unit is carefully constructed and installed no other attaching means between the rim 3 and the housing of the actuator 1 is required.

The nut or bushing 8 forms a guide for the plunger 2 and also forms a ledge in the housing to provide a fixed electrical contact in a manner which will be hereafter described. The plunger 2 includes an outer cylindrical cup member 12, a lining of insulating material 13 and an inner contact member 14. The cylindrical member 12 has a sliding fit in the bushing 8 and is provided with a circumferential flange 15 which, by engagement with the inner end of the bushing 8, limits the outward movement of the plunger. The inner member 14 of the plunger 2 is cylindrical and fits the cup member 12 tightly so that the cup member 12 and the inner member 14 are unitary, but electrically insulated from each other by the sheet of insulating material 13. The inner member 14 has a circumferential flange 16 adapted to engage and make electrical contact with the upper end of the bushing 8 as shown in Fig. 3.

The helical spring 6 is positioned in the inner member 14 of the plunger 2, engaging against an inwardly extending flange 17 of the member 14 and making electrical contact therewith. The other end of the spring 6 engages against a flange 18 on a terminal 19 of the wire 11. An insulating strip or washer 20 is positioned between the terminal 19 and the housing so that it is insulated therefrom.

In case of excessive pressure in the tube 4 the plunger 2 will be pushed inwardly with respect to its housing until the flange 16 engages the inner surface of the top wall of the member 7, about the flange 18. Thus electrical contact will be made with the housing by the flange 16 engaging the inner end of the bushing 8 in case of low pressure, or by the flange engaging the inner surface of the top wall of the housing in case of excessive pressure.

Fig. 5 is a circuit diagram showing the arrangement of the parts in a circuit to give a signal. A battery 21, having one side grounded as shown at 22, has a feed line 23 leading through a signal lamp 24 to brushes 25 in contact with collector rings 26 on the wheels of the automobile. The wire 11 is electrically connected to the liner 14 of the plunger 2 and makes contact with the top edge of the housing member 8 in case of low pressure, or with the top wall of the cylindrical member 7 in case of excessive pressure. It will be obvious that in case of abnormal or subnormal pressure in any of the tires a circuit will be complete to light the signal lamp 24, thus giving warning of improper conditions.

It is important, of course, that low pressures be indicated, and it may or may not be important that high pressures be indicated. It will be understood that the housing may be arranged so that connection may or may not be made, as desired, to indicate the excessive pressures.

Various changes may be made in the details of construction, within the scope of the appended claims, without departing from the spirit of this invention, and parts of the invention may be used to advantage without the whole.

I claim:

1. In a device for indicating tire pressure, an actuator unit attachable to a tire rim comprising a housing, a cylindrical plunger closed at one end, slidably mounted in the housing and arranged and proportioned to contact a tire tube mounted on the rim, a spring having a lower portion positioned within the plunger and engaging the closed end thereof and having its inner end mechanically engaging the top of the housing, an insulated contact member carried by the plunger, in engagement with the spring, and meeting an appropriate surface in the interior of the housing when the plunger is moved to an extreme position to make electrical contact therewith, and a conductor electrically connected to said spring.

2. In a device for indicating tire pressure, an actuator unit attachable to a tire rim comprising a housing, a cylindrical plunger closed at one end, slidably mounted in the housing and extending outwardly through an opening in the housing and arranged and proportioned to contact a tire tube mounted on the rim, an electrical contact member carried by the plunger comprising a liner for the plunger, insulated therefrom, having a circumferential flange extending over the top of the plunger and meeting an appropriate surface on the interior of the housing to make electrical contact therewith when the plunger is moved to an extreme position, a spring having a lower portion positioned within the plunger engaging the closed end thereof, making electrical contact with the liner and having its upper end mechanically engaging the top of the housing but insulated therefrom, and a conductor electrically connected to said spring.

3. In a device for indicating tire pressure, an actuator unit attachable to a tire rim comprising a housing, a cylindrical plunger closed at one end, slidably mounted in the housing and extending outwardly through an opening in the housing and arranged and proportioned to contact a tire tube mounted on the rim, a circumferential ledge about the interior of the housing, an electrical contact member carried by the plunger comprising a liner for the plunger, insulated therefrom, having a circumferential flange extending over the top of the plunger and meeting the ledge to make electrical contact therewith when the plunger is moved to an extreme position, a spring having a lower portion positioned within the plunger engaging the closed end thereof, making electrical contact with the liner and having its upper end mechanically engaging the top of the housing but insulated therefrom, and a conductor electrically connected to said spring.

4. In a device for indicating tire pressure, an actuator unit attachable to a tire rim comprising a housing, a cylindrical plunger closed at one end, slidably mounted in the housing and extending outwardly through an opening in the housing and arranged and proportioned to contact a tire tube mounted on the rim, a circumferential ledge about the interior of the housing, an electrical contact member carried by the plunger comprising a liner for the plunger, insulated therefrom, having a circumferential flange extending over the top of the plunger, and arranged and proportioned to meet the ledge to make electrical contact therewith when the plunger is moved to one extreme position and to meet the top of the housing when moved to another extreme position, a spring having a lower portion positioned within the plunger engaging the closed end thereof, making electrical contact with the liner and having its upper end mechanically engaging the top of the housing but insulated therefrom, and a conductor electrically connected to said spring.

5. In a device for indicating tire pressure, an actuator unit attachable to a tire rim comprising a housing, a portion of which is designed to extend through an orifice in the tire rim to form a liner therefor, a spring pressed plunger slidably mounted in said liner and proportioned to contact a tire tube mounted on said rim, a circumferential ledge about the interior of the housing, a circumferential flange on the top of the plunger positioned to contact the ledge to limit the movement of the plunger, an insulated contact member carried by the plunger and meeting an appropriate surface in the interior of the casing when the plunger is moved to an extreme position to make electrical contact therewith, and a conductor electrically connected to said insulated contact member.

GEORGE F. HUTCHINGS.